US007089915B2

(12) United States Patent
Guenther et al.

(10) Patent No.: US 7,089,915 B2
(45) Date of Patent: Aug. 15, 2006

(54) METHOD AND DEVICE FOR CONTROLLING AN ELECTROMAGNETIC CONSUMER

(75) Inventors: Uwe Guenther, Nufringen (DE); Andreas Glaser, Stuttgart (DE); Bernd Kudicke, Brackenheim (DE); Wolfgang Schmauder, Engstingen (DE); Juergen Eckhardt, Markgroeningen (DE); Oliver Heyna, Bietigheim-Bissingen (DE); Beate Leibbrand, Muehlacker (DE); Hartmut Albrodt, Tamm (DE); Thomas Wenzler, Hockenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/487,073

(22) PCT Filed: Jul. 27, 2002

(86) PCT No.: PCT/DE02/02781

§ 371 (c)(1),
(2), (4) Date: Aug. 23, 2004

(87) PCT Pub. No.: WO03/023211

PCT Pub. Date: Mar. 20, 2003

(65) Prior Publication Data

US 2004/0264096 A1 Dec. 30, 2004

(30) Foreign Application Priority Data

Aug. 16, 2001 (DE) ................................ 101 40 313

(51) Int. Cl.
*F02M 51/00* (2006.01)
*B60T 7/12* (2006.01)

(52) U.S. Cl. ....................................... 123/490; 361/152

(58) Field of Classification Search ................ 123/472, 123/476, 478, 482, 490; 239/585.1; 251/129.01; 361/152–156
See application file for complete search history.

(56) References Cited

U.S. PATENT DOCUMENTS 5,375,575 A * 12/1994 Ohishi et al. ............... 123/446
5,452,700 A * 9/1995 Matsuura ..................... 123/490
5,563,459 A * 10/1996 Kurosawa et al. ....... 307/141.4
5,592,921 A * 1/1997 Rehbichler .................. 123/490
5,645,097 A * 7/1997 Zechmann et al. ............ 137/1
5,878,722 A * 3/1999 Gras et al. .................. 123/506
5,880,920 A * 3/1999 Fischer et al. .............. 361/187
5,941,216 A * 8/1999 Arakawa ..................... 123/490
6,560,088 B1 * 5/2003 Beck et al. ................. 361/154
6,571,773 B1 * 6/2003 Yamakado et al. ......... 123/490
6,657,846 B1 * 12/2003 Philipp et al. .............. 361/160
6,766,789 B1 * 7/2004 Yamakado et al. ......... 123/490
2006/0007628 A1 * 1/2006 Rembold et al. ........... 361/160

FOREIGN PATENT DOCUMENTS

DE 40 20 094 1/1992
DE 43 29 981 3/1995
DE 44 15 361 11/1995
DE 195 13 878 10/1996
EP 0 306 839 3/1989
EP 0 669 457 8/1995

* cited by examiner

*Primary Examiner*—Hai Huynh
(74) *Attorney, Agent, or Firm*—Kenyon & Kenyon LLP

(57) ABSTRACT

A device and a method are described for controlling an electromagnetic user, especially a magnetic valve for influencing the fuel quantity to be injected into an internal combustion engine. At least one switching time of the user is taken into consideration in the control. The at least one switching time is ascertained starting from a current value.

10 Claims, 6 Drawing Sheets

METHOD AND DEVICE FOR CONTROLLING AN ELECTROMAGNETIC CONSUMER

FIELD OF THE INVENTION

The present invention is directed to a method and a device for controlling an electromagnetic consumer.

BACKGROUND INFORMATION

From German Published Patent Application No. 44 15 361, a method and a device for controlling an electromagnetic consumer is known. Such electromagnetic consumers are used especially for controlling fuel metering for internal combustion engines. In this application, a magnetic valve determines the injection duration and/or the beginning of injection.

In magnetic valves, a certain time span usually elapses between the control time and the reaction of the magnetic valve. This time span is usually designated as the switching time of the valve. This switching time depends on various parameters. Such parameters are, for example, the coil voltage and/or the coil temperature and/or the current flowing through the coil. A variable switching time of the magnetic valve, in turn, results in a variable injection duration and/or a variable injection beginning, and thus an injected fuel quantity that changes in an undesired manner.

From German Published Patent Application No. 195138 78, (U.S. Pat. No. 5,878,722) a method and a device for controlling an electromagnetic consumer is known. In the procedure described there, the duration of the control of the magnetic valve is corrected by a shut-off delay time of the current injection. This delay time is predefinable as a function of the instantaneous value of the current at the shut-off procedure.

Furthermore, it is known that, during shut-off, the mechanical switching times are functions of the shut-off current and the shut-off voltage. In order really to hold the influence of different shut-off currents to a low value, the current from the user is decommutated using the greatest possible extinction voltage. For this, components are required which have the appropriate voltage endurance. These components are comparatively expensive.

SUMMARY OF THE INVENTION

Since at least one switching time and/or one correction value are ascertained from a recorded current value, a very accurate control of fuel metering, especially of the beginning of fuel metering and/or the duration of fuel metering, is able to be achieved. Moreover, there are substantial cost savings compared to systems that are designed for high voltage endurances, because the switching time is predefinable as a function of the extinction voltage.

It is particularly advantageous if the closing time is taken into consideration for the stipulation of the beginning, and the shut-off time is taken into consideration for the stipulation of the duration of the control. Instead of the duration of the control, the end of the control may also be specified. In stipulating the end, the closing time and the shut-off time are to be taken into consideration.

The evaluation is especially simple and safe if the switching time is ascertained from a stationary current value and/or is ascertained from a current value which is measured directly before the shut-off. When the stationary current value is used, a correction can take place during the same injection, and/or may be undertaken during subsequent ones.

A particularly advantageous embodiment comes about if, starting from the current value, a valve characteristics curve is corrected. This means that the interrelationship between the control duration of the user and the injected fuel quantity is directly corrected. This correction takes place in such a way that, independently of the current which flows through the user, the control duration for the user is given that is required for metering in the desired fuel quantity.

In one particularly advantageous specific embodiment, it is provided that, instead of a current, an extinction voltage, or a variable derived from it, is evaluated. In the case of the extinction voltage, the voltage is involved that is present at the user during the shut-off procedure. This voltage is preferably recorded at the user connection that is connected to the voltage supply.

Particularly preferred is the specific embodiment in whose method the switching time and/or the correction value are ascertained starting from a time duration, while the extinction voltage is present. That is, the time duration is ascertained while the extinction voltage is present at the user. Preferably, that time duration is ascertained at which the extinction value falls off to below a threshold value (TS). Then the duration of the extinction voltage corresponds to the time segment between the turnoff of the user and the undershooting of the threshold value.

DETAILED DESCRIPTION

Figure 1:
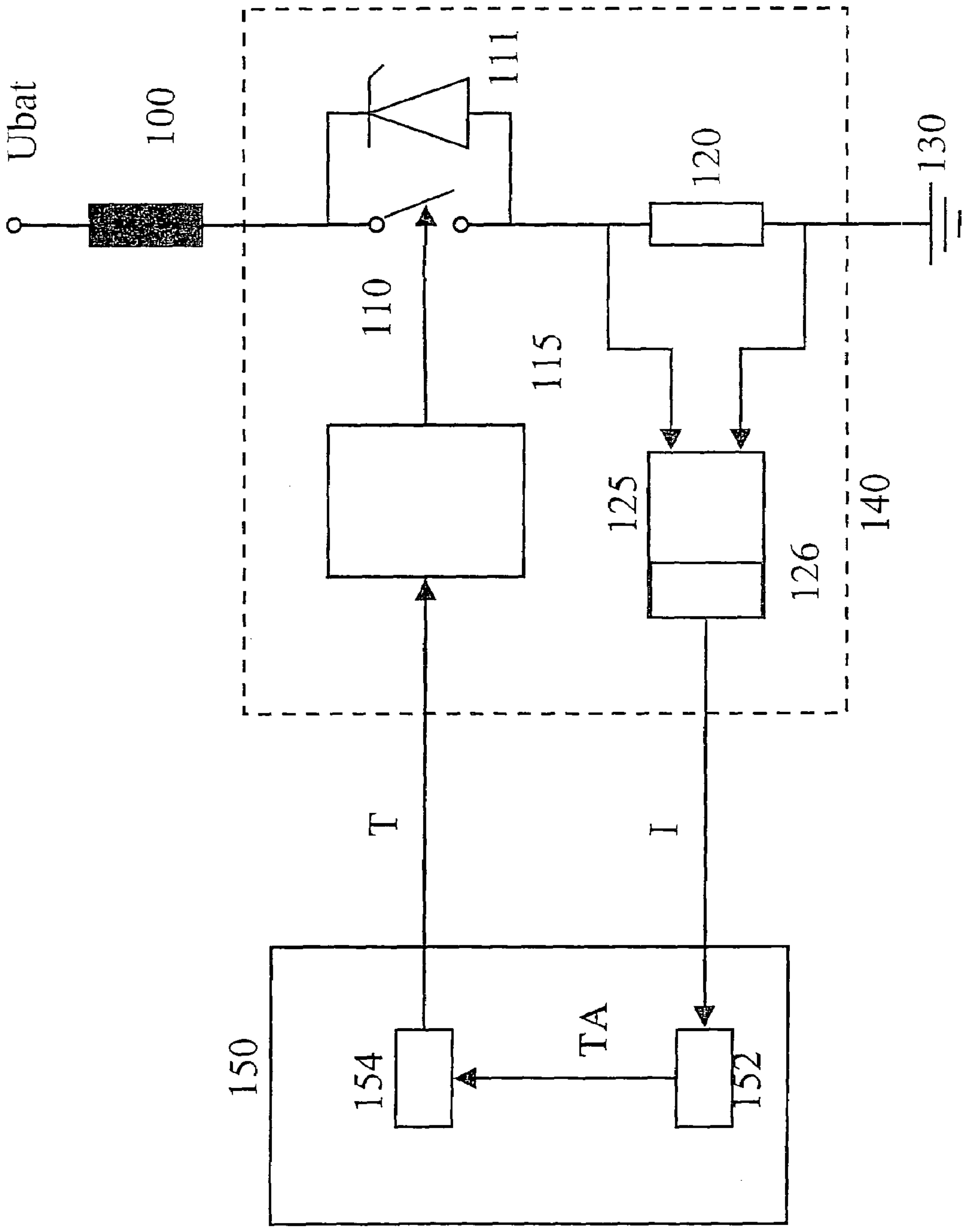
FIG. 1 shows essential elements of the device according to the present invention.

The present invention is described as follows, using the example of a device for controlling the fuel quantity to be injected into an internal combustion engine. However, the present invention is not limited to this application. It is always able to be used when the control duration of an electromagnetic user is to be controlled. This is especially the case when the control duration determines a variable such as, for example, the volume flow of a medium.

An electromagnetic user, especially a magnetic valve, is denoted by 100. A first terminal of magnetic valve 100 is connected to a supply voltage Ubat. A second terminal of the magnetic valve is connected to ground 130 via a switching means 110 as well as a current measuring means 120. Switching means 110 is preferably implemented as a transistor. The two terminals of the switching means are preferably connected via a voltage limitation means 111.

In the case of the current measuring means, preferably an ohmic resistor is involved, the voltage drop at the ohmic resistor being being evaluated for the current measurement.

Switching element 110 preferably receives triggering signals from a control 115. The voltage drop at current measuring means 120 is evaluated by a current sensing 125. This current sensing includes among other things an analog to digital converter and a register 126 for storing the current value. Components 110 to 125 form the so-called output stage 140, which is preferably developed as an output stage IC. Output stage 140 is preferably connected to a control unit 150 via an interface, and transmits over the latter at least the value of current 1 to control unit 150. Control unit 150 transmits a control signal T, which especially establishes the control duration and/or the control beginning, to the output stage, in particular to control logic 115. Control unit 150 includes, among other things, a switching time ascertainment 152, which is connected to the register of current sensing 125. Furthermore, control unit 150 includes a trigger time stipulation 154 which applies control signal T to control logic 115.

Control unit 150, especially trigger time stipulation 154, starting from various operating characteristics variables of the internal combustion engine and/or environmental conditions, calculates control signal T. This control signal T includes the information with regard to control beginning and/or control duration of the electromagnetic user. This control signal T is then converted by control logic 115 into signals for application to switching means 110.

Current 1 flowing through user 100 generates a voltage drop at current measuring resistor 120, which is ascertained by current sensing 125. Starting from the voltage drop, the current sensing ascertains the current value I and writes this into register 126. Switching time ascertainment 152 reads out current value I from the SPI register and determines switching times TA, starting from current value I. Switching times TA are taken into consideration by control time stipulation 154 in the determination of control signal T.

Figure 2:
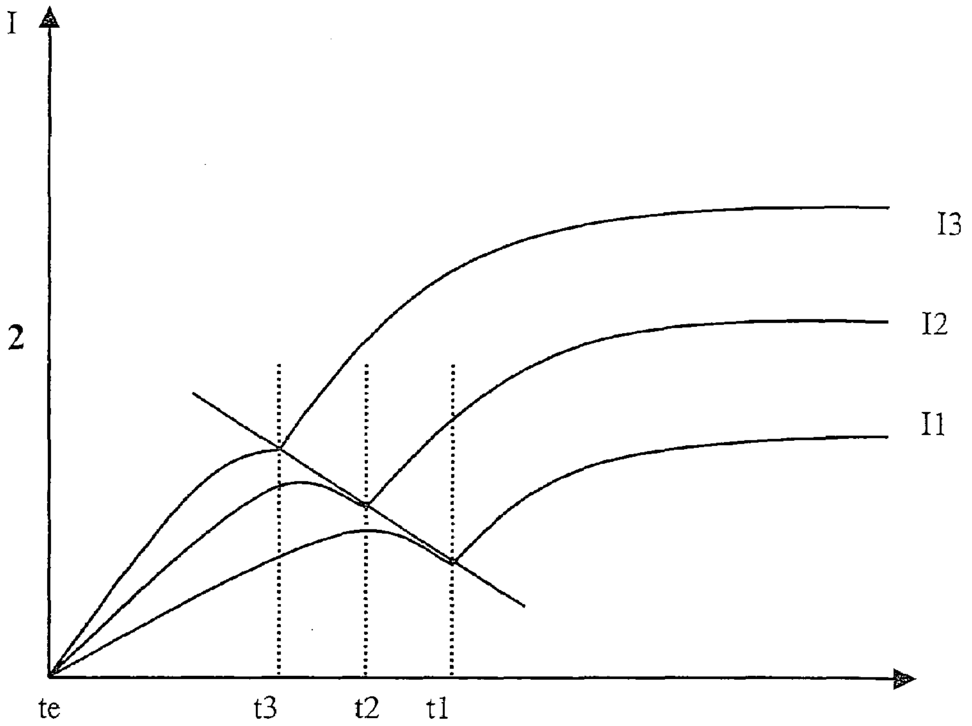
FIG. 2 shows the plot of the current at closing against time t.

FIG. 2 shows the plot of the current at closing against time t. In this context, three current patterns having different end values of current 11, 12 and 13 are shown. At time te, switching means 110 is closed and current flow through user 100 begins. Based on the inductance of the user, the current increases as an exponential function. After a certain time the needle of the magnetic valve begins to move, and the inductance of the user changes. If the magnetic valve needle reaches its new final position, i.e. the magnetic valve opens, the current in the exemplary embodiment has a kink. From this moment the current then increases to its end value 11, 12 or 13. The time at which the magnetic valve opens is shown respectively by t3, t2, and t1. The distance between closing time te and opening of the magnetic valve at time t3, t2 or t1 is usually denoted as switching time, especially as closing time. At large currents, preferably a small closing time sets in. At smaller currents, a larger closing time is produced.

It was recognized according to the present invention that this closing time is a function of the end value of the current. According to the present invention, this relationship is preferably stored as a characteristics map in switching time stipulation 152. Alternatively, it may also be provided that the current sensing is already undertaking a recalculation of the current into a switching time, and instead of the current, that it transmits a switching time or a correcting value to control unit 150.

Figure 3:
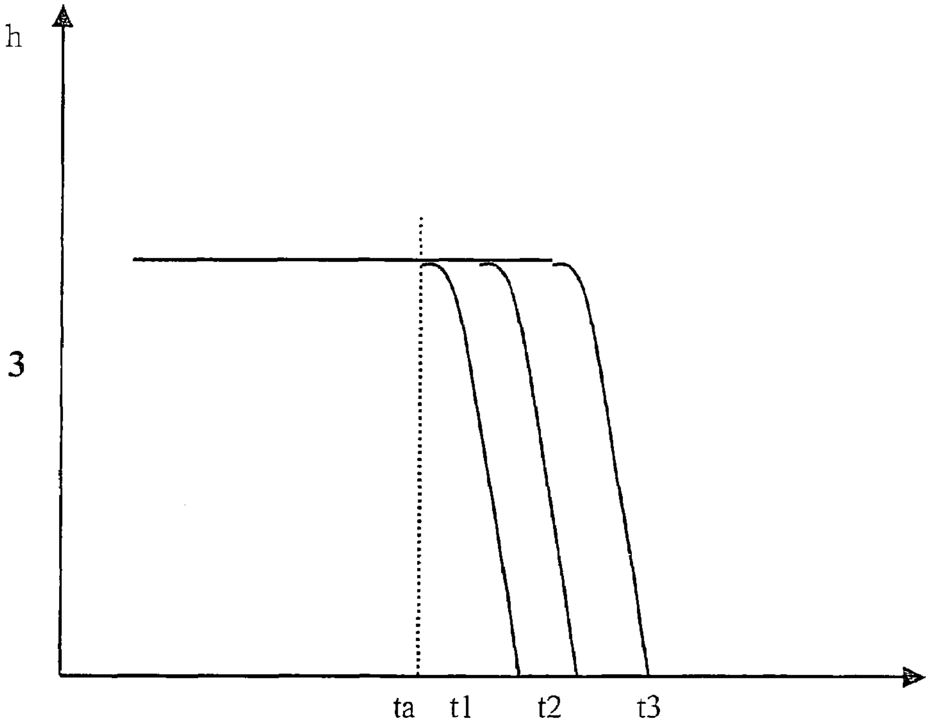
FIG. 3 shows the plot of the valve lift h at shut-off.

FIG. 3 shows the plot of the valve lift h at shut-off, i.e. at opening of switch 110 at time ta. Here, too, three stationary current values are specified, starting from which shut-off takes place. Beginning at point ta, the current falls off to zero according to an exponential function. This has the result that the magnetic valve needle moves slowly in the direction of its closed position. As a function of the current level and the clamp voltage, the shut-off becomes shorter or longer. When the needle lift curve touches the time axis at times t1, t2 and t3, the magnetic valve is closed. At a large current, a long turn off time comes about, and at a low current, a shorter turn off time comes about. At large currents, preferably a large turn off time sets in. At smaller currents, a smaller turn off time is produced.

According to the present invention, it was recognized that there is a relationship between the stationary end value of the current before turn off and the switching time, and this relationship is also stored preferably as a characteristics map in switching time stipulation 152, same as the closing time.

Preferably, the current value flowing through the user is measured in the steady, static state. This is done preferably ca 2 ms after closing the current flow, and, at the latest, directly before turning off.

It is especially advantageous if supply voltage Ubat is measured at the same time. Starting from the measured current value, the ohmic resistance of the user is directly determined. Starting from this, the temperature of the user may also be concluded. With that, the main variables influencing closing times and shut-off times are known, and consequently can be compensated for. For this, preferably characteristics maps or calculating methods are used.

According to the present invention it is provided that the closing time and the shut-off time are used for correcting the fuel metering. It is particularly advantageous if the closing time is used to correct the beginning of the fuel metering and the shut-off time for the correction of the end of the fuel metering. Preferably, the switching times ascertained during the preceding injection are used for the following fuel metering. In one especially advantageous embodiment it is provided that, if several similar users are provided, as is usually the case for fuel metering, the measurement is made only at one user, since the additional users are exposed to the same surrounding conditions, such as supply voltage or temperature.

It is particularly advantageous if the current is measured several times during the control, and only the highest measured current is used as the value for a metering.

Figure 4:
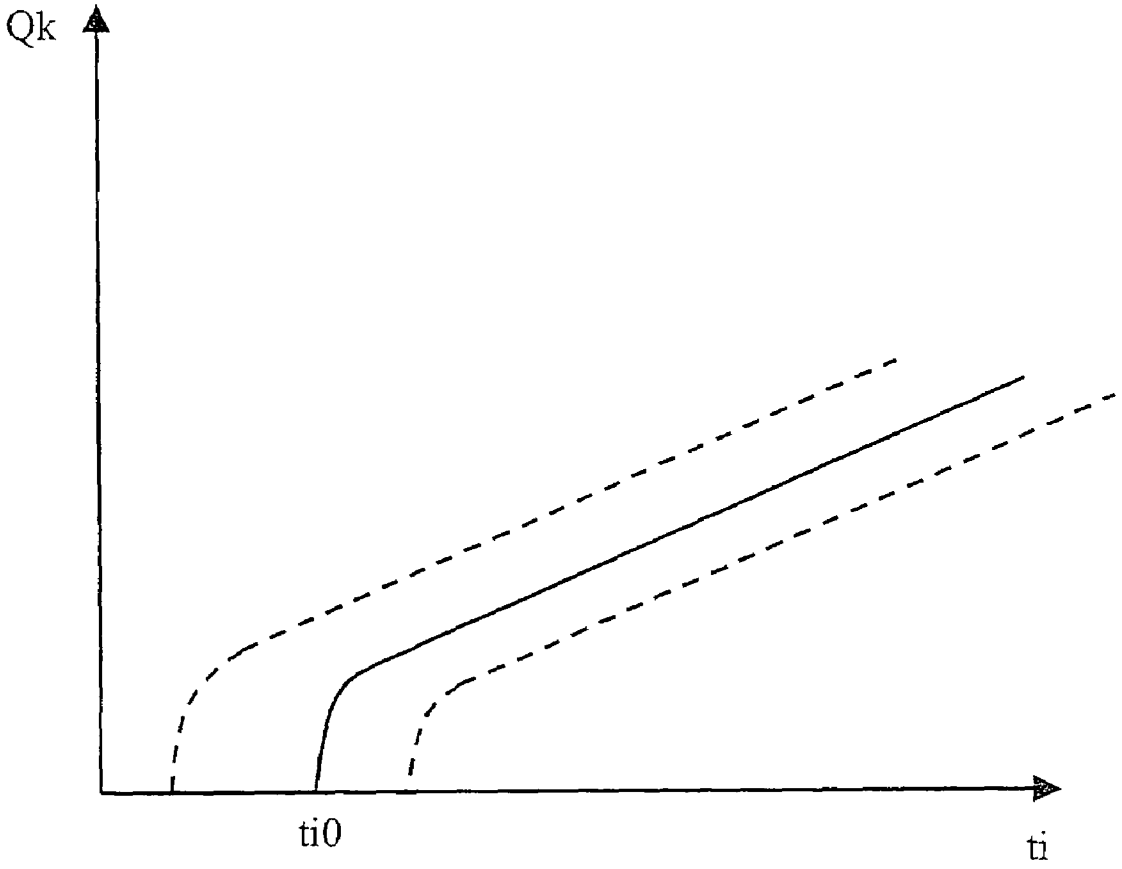
FIG. 4 shows a valve characteristics curve.

Usually, the control time stipulation includes a valve characteristics curve. In this valve characteristics curve there is stored the relationship between the desired fuel quantity QK to be injected and the duration ti of control signal T. An example of a valve characteristics curve is shown in FIG. 4. An idealized characteristics curve is drawn in with a solid line. Up to a minimum control duration ti0 there is no injection. From the minimum control duration on, the fuel quantity rises steeply. In the further course of the curve, there is an almost linear relationship between time ti and injected fuel quantity QK.

As a function of current I which flows through the user, different switching times result, as was shown above. This has the result that, at different currents, different characteristics curves are yielded. It was recognized according to the present invention that the current dependency results in parallel displacement.

According to the present invention, it is therefore provided that the current value is appropriately ascertained, and starting from this, a correction in the valve characteristics curve is made. This may, on the one hand, be implemented in that, for different current values different characteristics curves are stored and used in the control time stipulation. Alternatively, it may also be provided that a correction value is ascertained, using which the output variable and/or the input variable of the characteristics curve is corrected.

Figure 5:
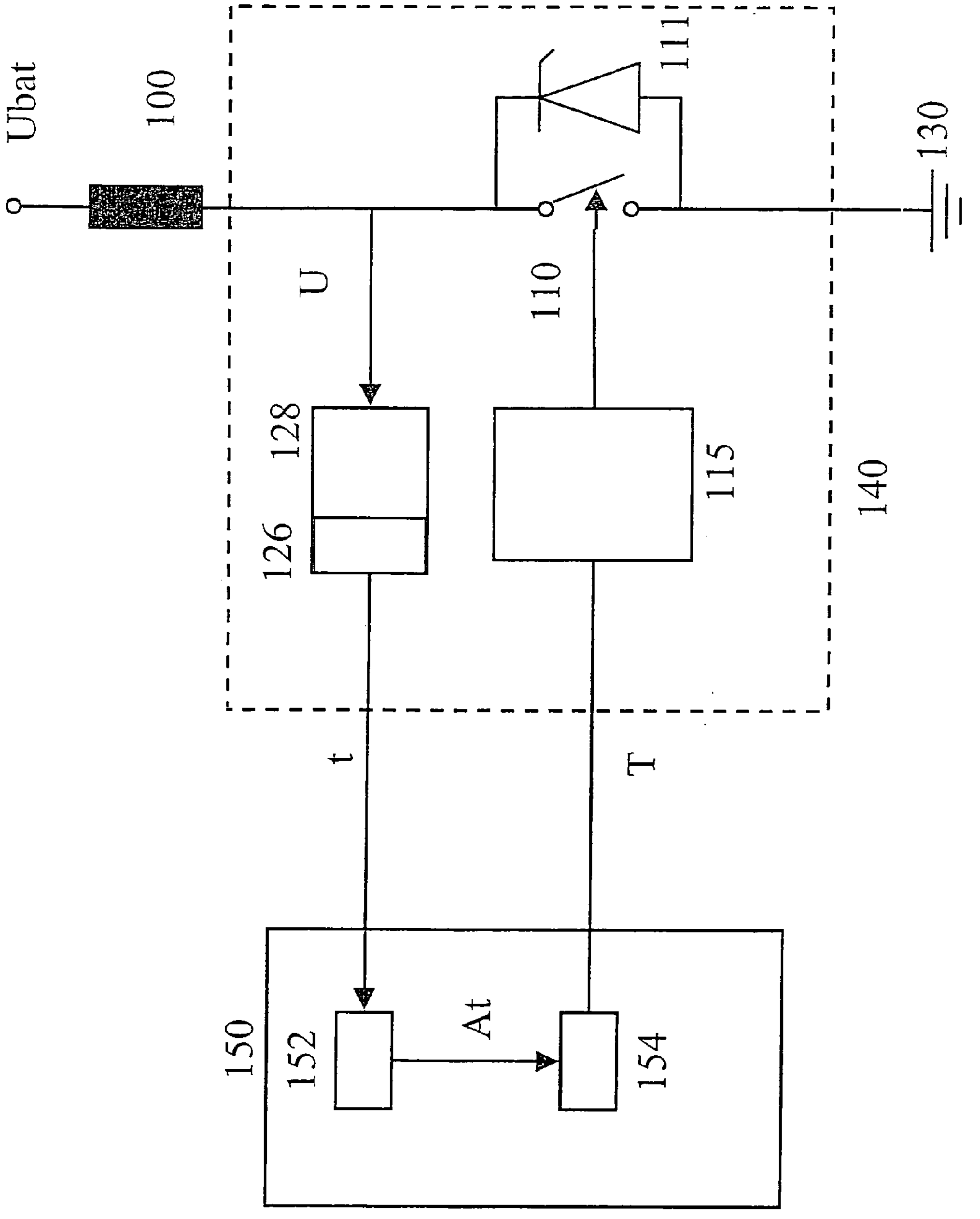
FIG. 5 shows essential elements of a further specific embodiment of the device according to the present invention.
Figure 5:
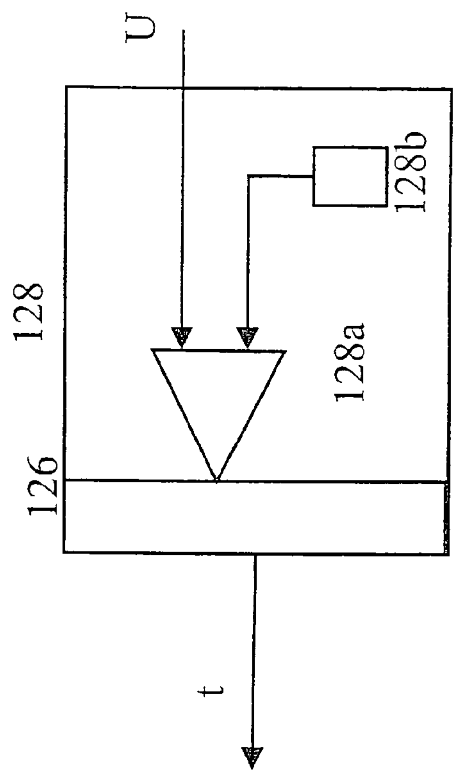

An additional particularly advantageous embodiment is represented in FIG. 5. The specific embodiment of FIG. 5 differs from the specific embodiment of FIG. 1 essentially in that, instead of a current sensing 125, a voltage sensing 128 is provided, which records the voltage U which is present at the connecting point of user 100 and switching means 110. This voltage sensing 128 supplies a signal t, which represents a time variable, to switching time ascertainment 152.

FIG. 5 shows voltage sensing 128 in detail. Voltage signal U reaches a comparator 128*a*, at whose second input an output signal TS of a threshold value stipulation 128*b* is present. The time at which the threshold value is exceeded, and or the time duration since the control of the user, are entered into register 126.

Figure 6A:
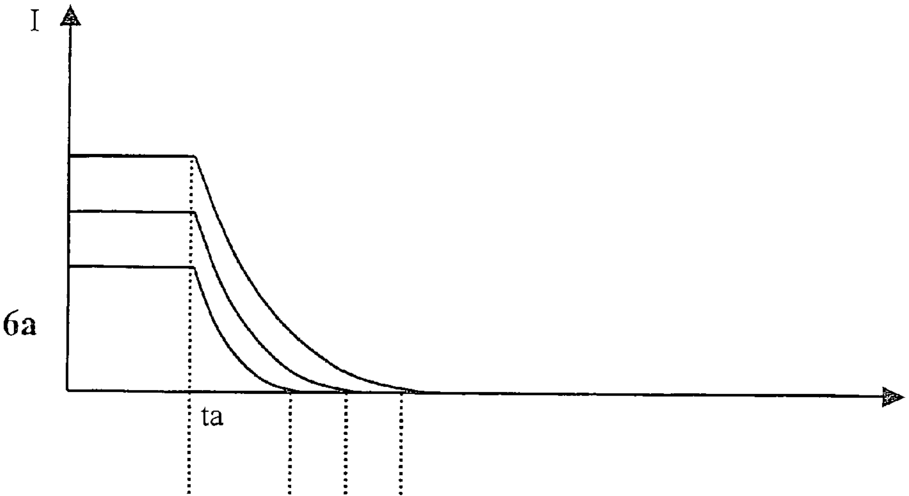
FIG. 6 shows various signals plotted against time.
Figure 6B:
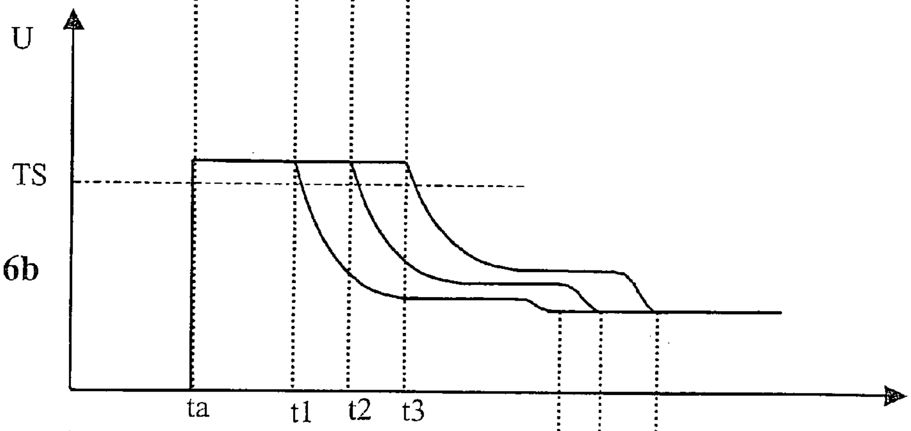
Figure 6C:
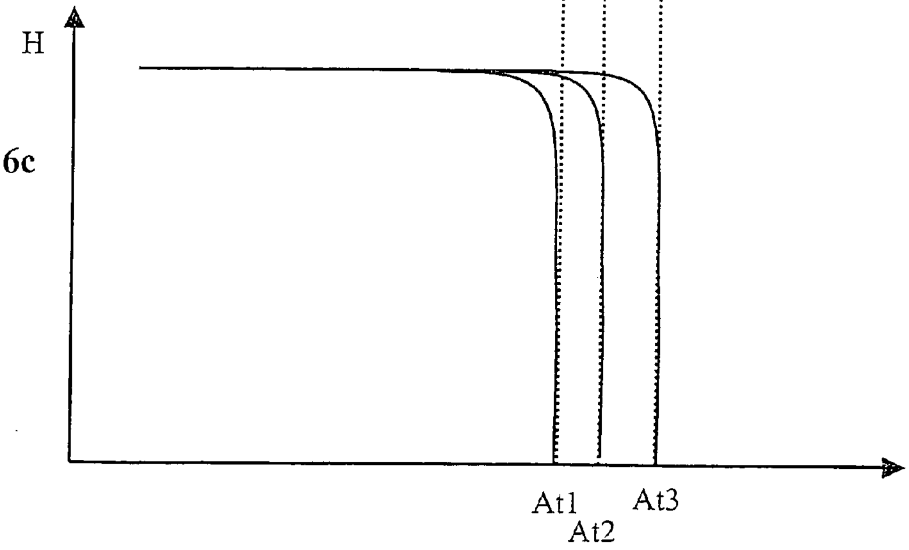

The functioning manner of this embodiment is described below, in the light of FIG. 6. In FIG. 6*a* the curve of current I, which flows through user 100, is plotted during the shut-off procedure. In FIG. 6*b*, in this context, voltage U present at the user is plotted against the corresponding time. In Figure c, the lift of the magnetic valve needle is plotted against time. Up to time ta, the stationary current value flows through the user. At time ta, the control of switching means 110 ends. From this point, the current falls off to zero, according to an exponential function. This has the result that, after a certain delay time, the magnetic valve needle moves in the direction of its closed position. As a function of the current level and the clamp voltage, the turn-off becomes shorter or longer. When the curve of the lift of the magnetic valve needle touches the time axis at points AT1, AT2 or AT3, the magnetic valve is closed.

Simultaneously with the activation of switching means 110, clamp voltage U increases to a value determined by Zener diode 111. As soon as current I has fallen off to 0, voltage U also falls off exponentially. This point in time, from which the voltage falls off, corresponds to time t1, t2 or t3, at which current I has fallen off to 0. At the point in time at which the magnetic valve needle has reached its final position, the voltage falls off to battery voltage $U_{Bat}$. According to the present invention, it was recognized that there is a relationship between time t1, t2, t3 at which voltage U falls off, and time AT1, AT2, AT3, at which the magnetic valve reaches its end position.

According to the present invention, this relationship is preferably stored as a characteristics map in switching time stipulation 152. Alternatively, it may also be provided that the voltage sensing is already undertaking a recalculation of times t1, t2, t3 to a switching time, and instead of the time at which the voltage falls off, it transmits a switching time or a correcting value to control unit 150.

In this context, according to the present invention, it is provided that time t1, t2 or t3 is ascertained by checking whether voltage U falls off to below a threshold value TS, which is specified by threshold value stipulation 128*b*. This time t1, t2 or t3 is stored in register 126 and turned over to switching time stipulation 152.

According to the present invention it was recognized that at the shut-off of an electrical user the mechanical fall-off time At, i.e. the time until the user reaches its end position, is a function, among other things, of the electrical parameters, such as the level of the shut-off current and the inductance. These parameters go into the temporal length of the shut-off voltage, i.e. into the difference between time ta and times t1, t2 or t3. The shut-off voltage is also denoted as extinction voltage.

According to the present invention, this time span is measured between time ta and time t1, t2 or t3. Starting from the length of the shut-off voltage, one may then conclude what the mechanical shut-off time At1, At2 or At3 is. This is done, for example, using characteristics map 152 shown in FIG. 5. From the knowledge of the exact mechanical shut-off time, the accuracy in the control of the electromagnetic users may be clearly improved. By reducing the extinction voltage which is thereby possible, a considerable cost advantage comes about.

According to the present invention it was recognized that the mechanical shut-off time is a function of the electrical variables, such as the current in the shut-off case, the inductance, the level of the extinction voltage, the coil resistance and/or supply voltage $U_{Bat}$. All these variables go into the length of the extinction voltage that is under consideration, in the shut-off case. The length of shut-off time ta up to the reaching of the trigger threshold is measured, according to the present invention. According to the present invention, from this time span the mechanical shut-off time is determined, particularly with the aid of a family of characteristics. This shut-off time At that is ascertained in this manner is then appropriately taken into consideration by control time determination 154 for determining control time T, as in the first specific embodiment according to FIG. 1.

Because of this procedure according to the present invention, it is possible to reduce the extinction voltage to lower values, at the same time the scatter in the shut-off times not being increased. Thereby considerable cost savings come about with respect to the components, since these no longer have to be designed for correspondingly high voltages.

The procedure according to the present invention is applicable generally to electromagnetic users. In particular, it can be applied in the case of fuel injectors or other magnetic valves, which are used in the field of fuel metering or in the control field in motor vehicles.

Since, as a rule, particularly all injection valves of an internal combustion engine, are exposed to the same surrounding conditions, such as battery voltage, engine temperature, fuel pressure, in a simplified specific embodiment it can be provided that the recording of the extinction voltage and/or of the shut-off current takes place only at one of the output stages of a magnetic valve.

The invention claimed is:

1. A method for controlling an electromagnetic user, comprising:

taking into consideration at least one switching time of the user in a control; and ascertaining the at least one switching time from a time duration during which an extinction voltage is present;

wherein the at least one switching time is ascertained starting from a point in time at which the extinction voltage falls below a threshold value, and wherein the time duration of the extinction voltage corresponds to a period of time between turning-off of the user and the point in time at which the extinction voltage falls below the threshold value.

2. The method as recited in claim 1, wherein:

the user includes a magnetic valve for influencing a fuel quantity to be injected into an internal combustion engine.

3. The method as recited in claim 1, wherein:

immediately before turn-off of the user, measuring a current value; and starting from the current value, ascertaining at least one of the at least one switching time and a correcting value.

4. The method as recited in claim 3, wherein:

the user includes a magnetic valve for influencing a fuel quantity to be injected into an internal combustion engine.

5. The method as recited in claim 3, wherein:

the current value is a stationary current value.

6. The method as recited in claim 3, further comprising:

reading out from a characteristics map at least one of the at least one switching time and the correcting value starting from the current value.

7. The method as recited in claim 3, wherein:

a correction of a valve characteristics curve takes place starting from the current value.

8. The method as recited in claim 3, wherein:

a correction of a duration of a metering in of fuel takes place starting from at least one of the at least one closing time and a shut-off time.

9. A device for controlling an electromagnetic user, comprising:

an arrangement for taking into consideration at least one switching time of the user in a control; and an arrangement for ascertaining the at least one switching time from a time duration during which an extinction voltage is present;

wherein the at least one switching time is ascertained starting from a point in time at which the extinction voltage falls below a threshold value, and wherein the time duration of the extinction voltage corresponds to a period of time between turning-off of the user and the point in time at which the extinction voltage falls below the threshold value.

10. The device as recited in claim 9, wherein:

the user includes a magnetic valve for influencing a fuel quantity to be injected into an internal combustion engine.

* * * * *